(12) United States Patent
Saghir et al.

(10) Patent No.: US 9,955,391 B2
(45) Date of Patent: Apr. 24, 2018

(54) ENHANCED CELL GLOBAL IDENTIFIER-BASED HANDOVER FROM AN ENODEB TO A HOME ENODEB

(71) Applicant: Verizon Patent and Licensing Inc., Arlington, VA (US)

(72) Inventors: Amir Saghir, Frisco, TX (US); Peter Li, West Orange, NJ (US); Atul Thaper, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 41 days.

(21) Appl. No.: 15/338,701

(22) Filed: Oct. 31, 2016

(65) Prior Publication Data

US 2017/0048767 A1 Feb. 16, 2017

Related U.S. Application Data

(63) Continuation of application No. 14/556,825, filed on Dec. 1, 2014.

(51) Int. Cl.
| | |
|---|---|
| *H04W 36/00* | (2009.01) |
| *H04W 36/04* | (2009.01) |
| *H04W 60/00* | (2009.01) |
| *H04W 36/30* | (2009.01) |
| *H04W 48/16* | (2009.01) |
| *H04W 64/00* | (2009.01) |

(52) U.S. Cl.
CPC ....... *H04W 36/04* (2013.01); *H04W 36/0061* (2013.01); *H04W 36/0072* (2013.01); *H04W 36/30* (2013.01); *H04W 48/16* (2013.01); *H04W 60/00* (2013.01); *H04W 64/003* (2013.01)

(58) Field of Classification Search
None
See application file for complete search history.

(56) References Cited

U.S. PATENT DOCUMENTS

| | | | | |
|---|---|---|---|---|
| 2011/0105131 | A1 | 5/2011 | Shaheen | |
| 2011/0243097 | A1* | 10/2011 | Lindqvist | H04W 24/02 370/331 |
| 2012/0015655 | A1* | 1/2012 | Lee | H04W 8/02 455/435.1 |
| 2012/0238268 | A1* | 9/2012 | Radulescu | H04W 36/0061 455/435.1 |
| 2012/0250602 | A1* | 10/2012 | Ou | H04W 4/20 370/315 |

(Continued)

*Primary Examiner* — Shantell L Heiber

(57) ABSTRACT

Examples are disclosed that facilitate using enhanced cell global identifier to effectively manage the handover of cellular communication services for a mobile device in an LTE network from a source, or serving, evolved Node B (eNB) to a target home evolved Node B (HeNB). The increased use of HeNBs to provide service to mobile devices creates issues for the management of tracking area identifiers associated with the eNB and HeNBs and may increase tracking area update (TAU) signaling in the cellular network. The handover of a mobile device moving from an eNB coverage area to a neighboring HeNB coverage area is managed without use of a tracking area identifier by using enhanced cell global identifiers assigned to the respective HeNB. The following provides examples for minimizing the burden on the network devices to manage the administration of TAIs and that may reduce TAU signaling in the cellular network.

20 Claims, 6 Drawing Sheets

(56) References Cited

U.S. PATENT DOCUMENTS

| | | | |
|---|---|---|---|
| 2012/0264431 A1* | 10/2012 | Lee | H04W 36/0061 455/436 |
| 2013/0231115 A1* | 9/2013 | Lin | H04W 36/0083 455/436 |
| 2014/0302851 A1* | 10/2014 | Yiu | H04W 76/00 455/436 |
| 2016/0044559 A1 | 2/2016 | Xu | |

* cited by examiner

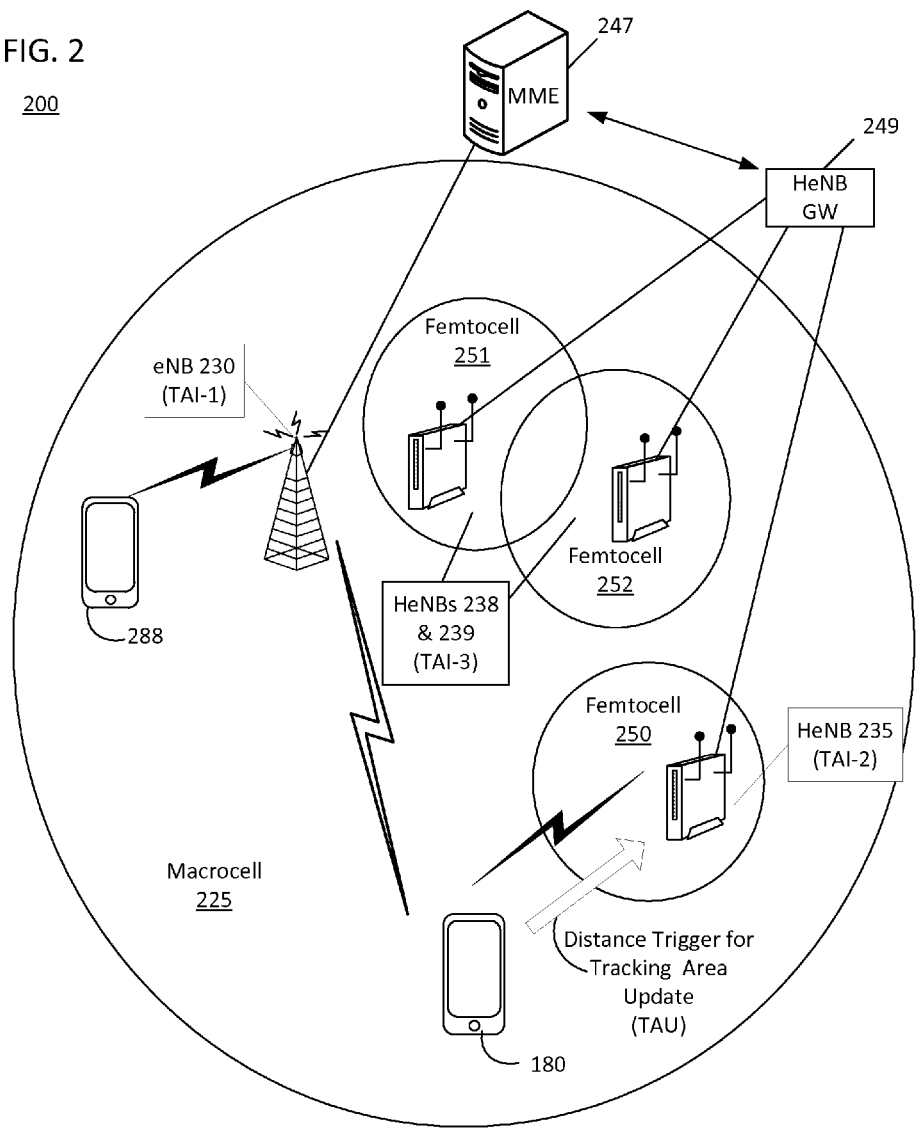

300

301

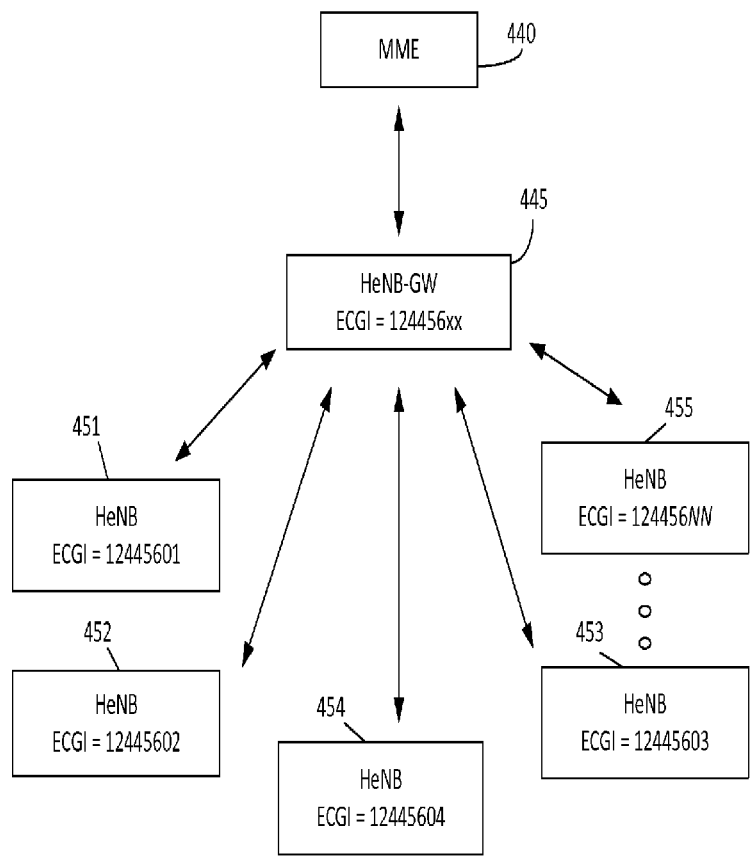

500

ENHANCED CELL GLOBAL IDENTIFIER-BASED HANDOVER FROM AN ENODEB TO A HOME ENODEB

RELATED APPLICATION

This application is a continuation of U.S. patent application Ser. No. 14/556,825, filed Dec. 1, 2014, which is incorporated herein by reference.

BACKGROUND

Wireless communications services and portable devices that use such services continue to increase in popularity. The wireless networks and mobile devices support a wide array of voice and data communication functions. A key feature of such devices and the wireless networks is mobility, that is to say, the ability of the user with the device to move freely from place to place and still operate the device to obtain wireless network services.

The capability of a cellular network to manage the movement of User Equipment (UE) within the cellular network is referred to as mobility management. The network device that manages UE mobility management in a radio access network (RAN), such as a Long Term Evolution (LTE) RAN network, may be referred to as a mobility management entity (MME). The MME uses identifiers related to the respective UEs as well as various identifiers related to the cells in which the respective UEs are located and/or the cells that UEs may next roam into. The cellular services within the cells are provided by base stations that provide the cellular services to the UE over an air interface. As the UE travels from one cell to another, the MME manages the delivery of cellular services to the respective UE. In order to efficiently manage the delivery of cellular services, each base station is assigned an identifier which a serving MME tracks in order to reach out to an idle UE. The general indication is a tracking area, which refers to a location being serviced by a base station. The purpose of a tracking area designation is so the MME does not have to scan an entire network to locate a UE. A tracking area may identify one or a group of cells. The UE assists the MME by reporting to the MME TA in which the UE is located. In addition, the UE maintains a list of TAs that were used or identified by the UE. For example, while idle the UE may detect base station reference signals and read overhead messages transmitted by the detected base station. The overhead messages include identifying information of the respective base stations. In addition, the UE may make measurements, such as received signal strength, of the respective reference signals. The identifying information in the overhead messages and the respective measurements may be stored by the UE for future use.

One of the identifiers included in the overhead messages is a tracking area identifier (TAI). In general, TAIs are identifiers of areas in which a UE has been serviced by one or more radio base stations, such as an evolved Node B (i.e., eNB). The number of TAIs is limited because each cellular provider only has 65535 tracking area codes available, and usually a large number of the TAIs are pre-allocated to the tracking areas (TAs) of the cellular provider to accommodate tracking areas that correspond to fixed eNBs; therefore, a small pool of TAIs is available for the more mobile HeNBs. As a UE travels closer to another eNB, a determination is made whether the UE would be better served (i.e., receive better quality of service) from a neighboring or target eNB as compared to the service that the UE is currently receiving from the serving, or source, eNB. The source eNB may make a determination that UE is better served by a neighboring eNB. The MME is informed via a handoff request of the impending eNB change from a source eNB identified by a first TA to the target eNB of a second TA. The transfer of service from the source eNB to the target eNB is referred to as a "handover." In case the source and target eNBs have different TAIs, a Tracking Area Update (TAU) procedure may get initiated by the UE so that the MME can update and store the new location (i.e., TAI) of the UE. This will help the MME to reach out to an idle UE based on the UEs last known location or TA in case some data needs to be delivered to that UE.

The handover process is covered by telecommunication standards, such as the current standard (i.e., 3GPP Release 12 (R12)). At a high level and according to the standard, there are three broad processes that constitute handover: 1) handover preparation, 2) handover execution, and 3) handover completion. The particular handover process discussed herein is a preliminary operation related to the handover preparation. After the handover preparation process discussed herein, the two other handover operations, handover execution and handover completion, that make up the broader handover operation occur. The handover execution and handover completion processes are unaffected by the improvements to the handover preparation discussed in the detailed description of the examples.

Similar to the revolution in UE devices becoming more powerful yet more compact, devices that offer the substantially the same functionality as the base stations described above are also becoming more powerful and compact. These base station-like devices, referred to as Home eNBs (HeNBs) are portable, provide cellular services to multiple UEs, and may be installed by consumers via an internet connection to a cellular service provider server. Once the HeNB is provisioned with the recommended parameter settings provided by a cellular service provider server, the HeNB provides an air link to the cellular communication network of the cellular service provider to which the UE may attach, and receive cellular service. The HeNB communicates with the MME in the same manner as an eNB. In effect, the HeNB is another eNB in the cellular network. As a result, the MME has to manage and service the UEs that may be in the area of the HeNB. The HeNBs typically provide cellular services to a small coverage area, often referred to as a femtocell. These femtocells are small geographical areas, and are typically in areas where cellular service from an eNB is poor, such as indoor locations, such as a building or urban canyon that are also not high UE traffic areas and the like. However, an HeNB may begin providing services within a coverage area of an eNB. As such, the HeNB falls substantially in the TA of an eNB.

A TA is identified by a tracking area identifier (TAI). The TAI of each base station, eNB and HeNB, under control of the MME is provided to the MME. There are a limited number of TAIs. The implementation of the TAI management concept did not take into account the implementation of HeNBs. As such, the type and deployment strategy for HeNBs is different and leads to a problem with the limited TAIs. A HeNB is a small scale shorter range device intended for deployments in users/customers premises (homes, offices, or the like). As a result, HeNBs are likely to be deployed in larger numbers and the cellular service provider is less likely to be able to control or know of the geographic coverage area such HeNBs provide. An MME routing the handover signaling messages based primarily on the TAI of the target HeNB would tax the limited TAI resources of the cellular service provider.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 illustrates an example allocation of tracking area identifiers according to the described subject matter.

FIG. 4 is a high-level functional block diagram of an example of a HeNB gateway configuration for implementing examples of the described subject matter.

DETAILED DESCRIPTION OF EXAMPLES

Figure 1:
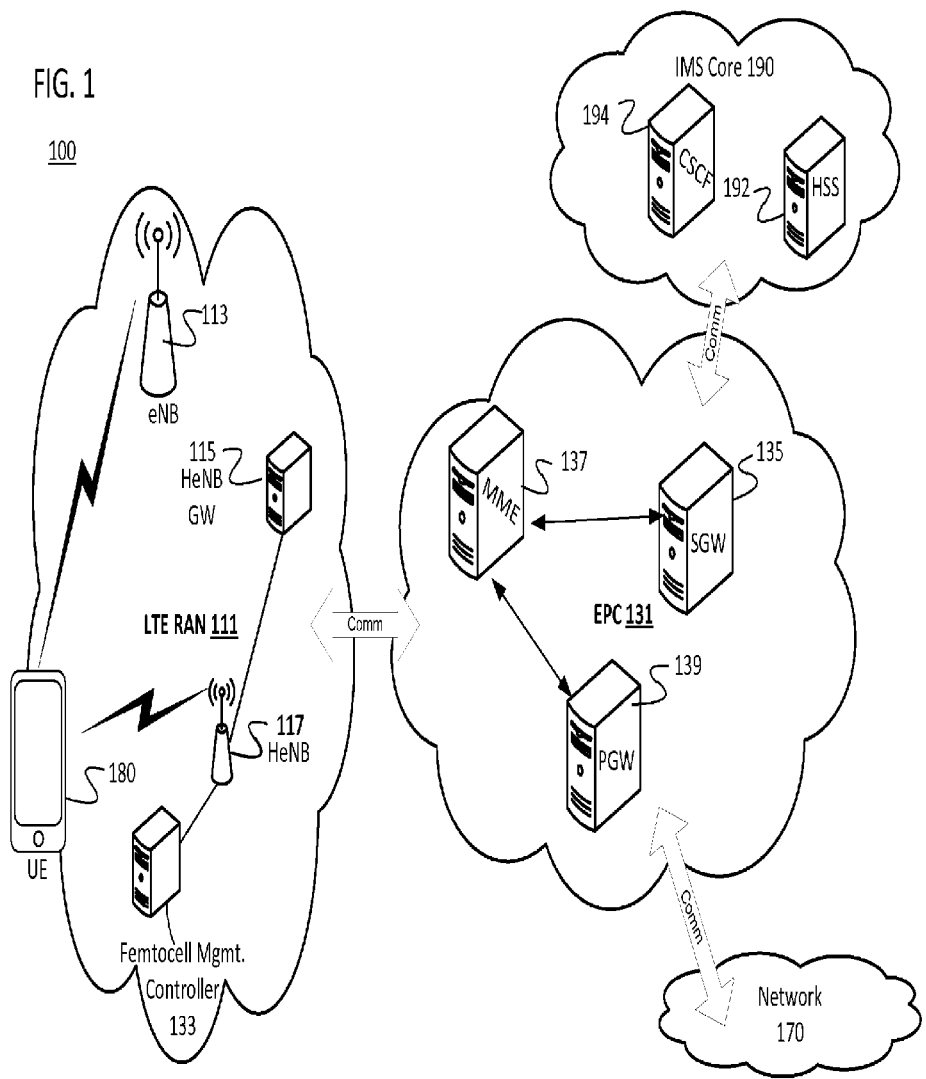
FIG. 1 is a high-level functional block diagram that illustrates an example environment 100 for implementing examples of the described subject matter.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The described examples are implemented in a LTE network environment, although the enhanced mobility may be utilized in wireless networks based on other mobile wireless technologies. The LTE network environment, in the examples, operates according to a Third Generation Partnership Project (3GPP) standard (i.e., the LTE standard) for mobile network technology. The LTE standard describes requirements for mobile communications systems in evolved or advanced cellular broadband technologies. Such requirements include Evolved Universal Mobile Telecommunications System (UMTS) Terrestrial Radio Access Network (E-UTRAN), which is a wireless network technology that implements a high-speed radio access technique to meet increased network demands, including improving user throughputs and network capacity, reducing latency, and increasing mobility.

User equipment devices obtain access to the E-UTRAN via a wireless network access device referred to as an evolved Node B (i.e., eNB or eNB) that is described in more detail with reference to FIG. 1. In a mobile communication network, the eNB is a hardware device that provides a wireless radio communication interface that facilitates the communication between a user's mobile device and other nodes or elements forming the mobile communication network. An eNB communicates with a UE over an air interface and communicates (both voice over IP (i.e., voice over LTE (VoLTE)) and data) with other network devices to send and receive information to the UE and other users or entities (e.g., websites or applications). An eNB may include one or more wireless transceivers that receive digitized voice and/or data from a radio network controller and transmit that voice and/or data to UE via a downlink of the air interface. One or more wireless transceivers of the eNB also receive digitized voice and/or data from the UE via an uplink of the air interface and transmit that voice and/or data via the radio network controller to/through other elements or nodes of the network, e.g. to other UE devices and/or to websites or other application servers.

The owner of an HeNB subscribes to a specific cellular communication service provider, or mobile network operator for the provision of cellular service to the HeNB. The HeNB connects to broadband Internet access network at the premises where the owner intends to use the device, e.g. to a cable modem service or to a fiber-to-the-home type Internet service provider network. To a mobile device, however, the HeNB appears the same as a macro eNB of the broader area public cellular LTE network. A typical use of an HeNB is for providing cellular coverage within an office building or to an area with poor cellular coverage that also has low traffic (i.e., a modest number of UE moving in and out to the femtocell).

A UE, such as UE 180, in the area of an HeNB can attach to the cellular communication network via the HeNB and obtain cellular service (i.e., voice and data communications). When an HeNB connects to a mobile communication network, the mobile communication network begins tracking any UE that connects to the HeNB. An HeNB can be implemented wherever access to the Internet or similar type of network that allows connectivity to servers of a cellular communication service provider is available. Once the HeNB is connected to Internet access service, the UE can begin detecting reference signals from the HeNB within a coverage area of an eNB. As a result, the UE begins reporting the presence of the HeNB as a potential connection point to entities within the mobile communication network.

The various examples disclosed herein relate to facilitating a handover of control of a user equipment (UE) device of a user moving from an eNB coverage area to a neighboring HeNB coverage area. The following provides examples for minimize the burden on the network devices to manage the administration of TAIs. The examples utilize alternate information provided according to the 3GPP standards to facilitate the handover of control without having to rely upon a TAI of a eNB or HeNB. Reference now is made in detail to the examples illustrated in the accompanying drawings and discussed below.

FIG. 1 is a diagram of an example environment 100 in which systems and/or methods described herein may be implemented. As shown in FIG. 1, environment 100 may include a mobile device or UE 180, a long term evolution (LTE) type radio access networks (RAN) 111, an evolved packet core (EPC) network 131, a network 170, such as the Internet, and an Internet protocol (IP) multimedia subsystem (IMS) core network 190. Communications of any form between the respective network elements 111, 131, 170 and 190 are illustrated by the arrows labeled COMM, and can take the form of wired or wireless communications.

The LTE RAN 111, for example, is a radio access network (RAN) that includes a number of network components that provide packet data transport services to user equipment (UE), such as UE 180. For example, the LTE RAN 111 includes one or more devices for transmitting voice and/or data to UE 180 and to EPC network 131 and core network 190. In one example implementation, the LTE RAN 111 includes a group of base stations 113, 117 implemented as eNBs and HeNBs, respectively. In one example, the LTE RAN 111 provides a wireless access network for UE 180. In another example, the LTE RAN 111 includes a WiFi network or other access networks (e.g., an enhanced high-rate packet data (eHRPD) network or a WiMax network). In the current LTE example, the LTE RAN 111 utilizes packet switching. For convenience, switches and/or routers for handling the flow of packets through the LTE RAN 111 are omitted.

Signaling between the LTE RAN 111 and the EPC Network 131 is performed according to different protocols. One such protocol is an S1 interface protocol. The S1 interface represents the interface between the respective eNBs in the network and the EPC network. The S1 interface has two different interfaces: the S1-MME interface for exchanging control signals (eNB and MME, HeNB GW and MME, and (in other implementations) HeNB and MME) and the S1-U interface for exchanging voice and data communications. In an example, the S1-MME interface for exchanging control signals exists between eNB 113 and MME 137; HeNB GW 115 and MME 137; and an individualized HeNB (not shown in FIG. 1, but see, for example, HeNB 347 of FIG. 3B) and MME. In other examples, the S1-MME interface is implemented only between the eNB and the MME; and the HeNB GW and the MME. In an example, the S1-U interface for exchanging control signals exists between the eNB and SGW 135, HeNB GW and SGW 135 and an individualized HeNB (not shown in FIG. 1, but see, for example, HeNB 347 of FIG. 3B) and SGW 135. The S1 interface protocol communications are illustrated by the COMM arrow between the LTE RAN 111 and the EPC 131.

The EPC 131 is provided by the cellular communication service provider (i.e., a mobile communication network operator (MNO)) and facilitates the exchange of data packets containing voice and data communications. In an example, the LTE RAN 111, the EPC network 131 and the IMS core 190 are provided by a cellular communication provider (i.e., MNO). An EPC network may include nodes and functions that provide Internet Protocol (IP) connectivity to and from one or more LTE RAN 111 and the UE 180, for data, voice, and multimedia services. The EPC network 131 utilizes packet switching for packet transport, although for convenience, switches and/or routers for handling the flow of packets through the EPC network 131 are omitted. When a UE registers with the EPC network 131 through an attach procedure, information about the UE 180 is stored in a MME device 137. Thus, a MME device 137 in the EPC network 131 includes a database that stores information about UEs including UE 180.

As shown in FIG. 1, EPC network 131 connects UE 180 to one or more external IP networks 170. The EPC network 131 may connect to other networks, such as the public switched telephone networks, although such other connections are omitted for ease of illustration. The EPC network 131 typically include one or more devices that implement logical entities interconnected via standardized interfaces, and that provide wireless packet-switched services and wireless IP connectivity through the LTE RAN 111 to UE 180 for both data and voice services. The EPC network 131 may allow the delivery of broadband IP services and may interface with external IP network 170 (e.g., an IMS network) for application services offered or controlled by the carrier or other service provider operating the overall mobile service network (including networks 111 and 131). In some examples, the cellular service provide network, or mobile communication network, includes the LTE RAN 111, the EPC network 131 and the IMS core 190. Of course, components of each of 111, 131 and 190 may be incorporated into the other to omit or augment functionality in one network or another.

The UE 180 may take the form of any communication device that a user may use to connect to EPC network 131 through the LTE RAN 111 and in some cases through other wireless access networks (and/or intermediate networks).

The eNB 113 may include one or more devices (e.g., processors and transceivers) and other components and functionality that allow UE 180 to wirelessly connect to EPC network 100. The eNB 113, for example, is a macro-scale base station and provides cellular communication service to a macrocell coverage area. The eNB 113 interfaces with EPC network 131 via the S1 interface protocol, which may be split into a control plane S1-MME interface (not shown) and a data plane S1-U interface (not shown). The S1-MME interface interfaces the control functionality within the eNB with MME device 137 in the EPC network 131, by defining the messages and contents thereof exchanged between the control functionality within the eNB and the MME device 137. The S1-MME interface may be implemented, for example, with a protocol stack that includes a Non Access Stratum (NAS) protocol and/or Stream Control Transmission Protocol (SCTP). The S1-U interface interfaces the control functionality within the eNB with serving gateway (SGW) 135, by defining the messages and contents thereof exchanged between the control functionality within the eNB and the SGW 135; and the S1-U interface is implemented, for example, using a General Packet Radio Service Tunneling Protocol version 2 (GTPv2).

The HeNB 117 is a base station that provides substantially the same functionality as the eNB, but on a smaller scale. For example, the HeNB 117 is a portable device and includes a processor, a wireless transceiver for accessing LTE RAN 111, and components for forming connections to the internet via other wired or wireless networks (e.g., WiFi, fiber optic or the like). In the examples, the HeNB 117 is considered a small-scale base station that provides a small-scale cell, or femtocell, coverage area. The connection between the femtocell management controller 133 and the HeNB 117 is a connection, such as for example, a fiber optic or coaxial, a microwave, or satellite connection, and may traverse one or more networks. Communications of any form between the femtocell management controller 133 and the HeNB 117, and/or the HeNB-GW 115 are illustrated by the connections between the elements, and can take the form of wired or wireless communications. The HeNB-GW 115, for example, is similarly connected to the HeNB 117 and any other HeNB 117 managed by the HeNB-GW 115. From the perspective of the HeNB 117, the HeNB-GW 115 appears to as an eNB, such as eNB 113. The HeNBs in the environment 100, such as HeNB 117, are managed by a femtocell management controller 133, which is part of the LTE RAN 111. The femtocell management controller 133, for example, at time of initialization establishes a secure connection (e.g., based on exchange of authentication credentials and/or other subscriber-related information) between the HeNB, such as HeNB 117, and mobile communication provider servers (not shown) in the EPC 131. The femtocell management controller 133 has access to pre-configuration information for any HeNBs that will be joining the mobile communication network of the environment 100. During process for the provisioning the HeNB with the mobile communication network, the HeNB will provide location information (such as global positioning system (GPS) information) to the femtocell management controller 133. Based on the location information, a TAI is assigned to the HeNB by the femtocell management controller 133. Using the pre-configuration information, the femtocell management controller 133 begins to provision the HeNB with preconfigure settings based on the location (i.e., TAI) of the HeNB to obtain from or provide the HeNB with the information and settings needed for the HeNB to be operational within the mobile communication network. This type of implementation, for example, allows for a more rapid provisioning of the HeNB into the mobile communication network as compared to an eNB setup and provisioning.

The MME device 137 implements, among other functions, control plane processing for EPC network 131 for management of mobility of UE devices such as 180 roaming amongst cellular service areas covered by one or more LTE RAN 111. The MME 137 communicates with the eNB 113 and the HeNB-GW 115. For example, MME device 137 via communications with the respective eNB 113 and the HeNB-GW 115 implements tracking and paging procedures for UE 180, activates and deactivates bearers through networks 111, 131 for UE 180, authenticates a user of UE 180, and may interface to non-LTE RAN. The MME device 137 also selects a particular SGW 135 to service a communication session for a particular UE 180.

In some examples, the MME device 137 (i.e., a network device) manages multiple base stations, such as eNB 113 in LTE RAN 111. The MME 137 sends and receives information associated with mobile devices, such as UE 180. For example, the eNB 113 may be a servicing, or source base station that provides cellular communications to the mobile device UE 180. However, as the mobile device UE 180 travels better quality cellular communications may be provided by the HeNB 117. As a result, the eNB 113 may determine to allow the target base station device, or target HeNB 117, to take over control of communication services for the mobile device UE 180. After handover of control, the MME device 137 continues to provide control plane processing for mobile devices serviced by the target base station device, such as HeNB 117, when the UE 180 travels away from the eNB 113.

For example, the MME device 137 may communicate with SGW 135. The MME via the S11 interface creates and manages a new session for a particular UE 180. The S11 interface is activated when MME device 137 needs to communicate with SGW 135, such as when the particular UE 110 attaches to EPC network 131, when bearers need to be added or modified for an existing session for the particular UE 180, when a connection to a new packet data network (PDN) gateway (PGW) 139 needs to be created, or during a handover procedure (e.g., when the particular UE 110 needs to switch to a different SGW 135). While the control functions are managed by the MME 137, the actual delivery of the data communications is handled by the SGW 135 of the EPC 131. For example, the SGW 135 provides data pathway to and from UE 180, may handle forwarding of data packets for UE 110, and acts as a local anchor point during handover procedures between eNBs 113 as well as handover procedures between the eNBs 113 and any HeNBs 117 via the HeNB gateway (HeNB-GW) 115.

The HeNB-GW 115 manages the data communication signals and the control plane signals exchanged between the MME 137 and the HeNB 117. From the perspective of the MME 137, the HeNB-GW 115 appears to be an eNB, such as eNB 113. The HeNB-GW 115 is configured to include a processor and memory and connects to the respective HeNBs under its control the LTE radio access network 111. The HeNB-GW 115 acts as a gateway for signals from the MME 137 to the HeNBs managed by the HeNB-GW 115. The HeNB-GW 115 will be described in more detail with reference to examples of FIGS. 2-6. The HeNB-GW 115 is configured to handle multiple HeNBs, but only one HeNB 117 is shown for ease of explanation.

The IMS core network 190 includes HSS/AAA server 192 and/or CSCF server 194. The MME 137 communicates with the HSS/AAA server 192 and/or CSCF server 194 when a mobile device, such as mobile device UE 180 is attempting to attach to the mobile communication network (i.e., the LTE radio access network, the EPC 131 and the IMS core network 190). The HSS/AAA server 192 and CSCF 194 provide or assist with the authentication, session initiation, account information, profile information, and the like associated with mobile device UE 180. Of course, the IMS core network 190 may include additional components to provide functionality associated with the UE 180.

Network 170 may include one or more wired and/or wireless networks. For example, network 170 may include a cellular network, a public land mobile network (PLMN), a second generation (2G) network, a third generation (3G) network, a fourth generation (4G) network, a fifth generation (5G) network, and/or another network. Additionally, or alternatively, network 170 may include a wide area network (WAN), a metropolitan network (MAN), an ad hoc network, an intranet, the Internet, a fiber optic-based network, and/or a combination of these or other types of networks. Additionally, or alternatively, network 170 may include, or connect to, an external IP network. The external IP network may include, for example, another IMS network, which may provide voice and multimedia services to user device 180, based on the Session Initiation Protocol (SIP). Herein, a cellular network may refer to a portion of environment 100 and/or one or more other networks.

Although FIG. 1 shows example devices/networks of environment 100, in other implementations, environment 100 may include fewer devices/networks, different devices/networks, differently arranged devices/networks, and/or additional devices/networks than depicted in FIG. 1. Alternatively, or additionally, one or more devices of environment 100 may perform one or more tasks described as being performed by one or more other devices of environment 100.

FIG. 2 illustrates an example allocation of tracking area identifiers according to the described subject matter. In the cellular network environment 200 of FIG. 2, the cellular coverage area, or macrocell 225, is serviced by a macro-scale base station, such as eNB 230. The cellular network environment 200 includes user equipment devices 288 and 180. Both UE 288 and 180 obtain cellular voice and data communications from the eNB 230. The eNB 230 communicates with an MME 247 of the cellular communication network. The MME 247 manages the provision of cellular voice and data communications and control services to the UE 288 and 180. Based on the physical location of the eNB 230, a tracking area identifier (TAI) is assigned to the eNB 230. The MME 247 maintains a listing of TAIs and the eNBs assigned the respective TAIs. More than one eNB may be assigned the same the TAI. In the illustrated example, the TAI assigned to eNB 230 is TAI-1. The TAI assigned to the eNB 230 is also sent to the eNB 230 for distribution to all UE devices within range of the eNB 230. For example, UEs 288 and 180 are provided with the eNB 230 TAI of TAI-1. Each mobile device, such as UE 288 and 180, maintain a list of base stations, such as eNB 230, that are detected by the respective mobile devices. On occasion, or periodically, the respective UE 288 or 180, for example, in response to instructions from the MME 247, surveys the environment to detect base stations, such as eNB 230, that are transmitting reference signals. Upon receipt of the reference signals, the UE 288 and 180 may analyze the reference signals from the respective base stations. For example, the UE 288 and 180 may determine a received signal strength (RSS) indicating how close the UE is to one or more base stations, or how unobstructed the respective base station signals are in comparison to other base station signals. Of course, reference signals of base stations from macrocells (not shown) other than macrocell 225 may also be detected and analyzed. The results of the analysis are reported to the MME 247.

As discussed above, HeNBs, such as HeNB 235, are able to be added to the cellular communication network at almost any location that provides access to the Internet, such as networks 170 of FIG. 1. Upon establishing the Internet connection and exchanging provisioning information with the MME 247 of the cellular communication network provider, the HeNB 235 is configured to begin providing cellular service in a small coverage area shown as femtocell 250. An HeNB management element, such as femtocell management controller 133 in FIG. 1, assigns the HeNB 235 to an HeNB-GW, such as HeNB-GW 249, for managing control of the HeNB 235. A purpose of an HeNB-GW is to aggregate the control plane traffic of multiple HeNBs, such as HeNB 235, connected directly to the HeNBs and to interact with the MME 247 in the same manner as a single eNB. In such a case, the HeNB 235 provides substantially the same functionality and has substantially the same capabilities as the eNB 230 except on a smaller scale and with limited range (i.e., limited coverage area as compared to eNB 230). In other words, the HeNB 235 is a small-scale base station, which has a limited coverage area, such as approximately one square city block, approximately two acres, approximately 35-500 feet radius from HeNB antenna or the like. The femtocell 250 coverage area provided by the HeNB 235, in the example, arises within the macrocell 225 serviced by eNB 230. UE in the area of the femtocell 250 are able to receive cellular data and voice communication service from the HeNB 235, and may also be able to obtain service from eNB 230. For example, an example of limited range may be an enterprise campus that includes four buildings arranged in a square that covers several acres in which a single HeNB in the center of the square provides service to the enterprise's employees in each of the four buildings.

In order to account for the presence of the HeNB 235, the cellular service provider preconfigures the HeNB management system with the TAI allocations, and, during the provisioning of the HeNB 235 with the network, the appropriate TAI is assigned to the HeNB 235. However, the number of TAIs available for assignment to HeNBs under control of HeNB-GWs is limited to those TAIs dedicated for assignment to an HeNB-GW. Recall that only a limited number of dedicated TAIs, as explained above, are available for assignment. In the example of FIG. 2, TAI-2 has been assigned to the HeNB 235. Other HeNBs 239 may also be in the area and have been assigned TAIs different from TAI-2. In different implementations, several of the other HeNBs may be assigned the same TAI. For example, femtocells 251 and 252 and the respective HeNBs 238 and 238 share the same TAI (i.e., TAI-3) due their respective geographical location of the HeNB. In some examples, a HeNB-GW may manage a number of HeNBs associated with a large enterprise, such as a manufacturing facility or college campus, in which the capabilities (e.g., range, bandwidth capabilities and the like) of all of the HeNBs are the same. In other examples, a HeNB-GW may manage a number of HeNBs that have different capabilities, such as one HeNB may have short range and limited bandwidth, while another HeNB managed by the same HeNB-GW may have a longer range and a greater bandwidth.

The UE 180 and UE 288 are constantly monitoring their environment, for example, by detecting signal differences between signals received from one base station and those received from another base station. For example, the UE 180 may determine the RSS of signals from a respective base station as mentioned above. Based on the determined RSS, for example, the UE 180 may determine that one base station is providing a higher quality signal than another base station.

For example, the UE 180 sends the signal measurement information to the serving eNB, for example, eNB 230. The serving eNB 230 receives the signal measurement information from the UE 180, and based on the signal measurement information determines that another base station 235 in femtocell 250 is better suited for providing optimum service to the UE 180. The MME 247 uses the information reported by the respective UEs under control of the MME to perform the UE's access control and to assist with the message flow between base stations included in the reported information that would provide optimum service to the UE. For example, the UE 180 may be receiving a signal with a much higher RSS from the HeNB 235 than signals received from the eNB 230. Based on this information regarding the much higher RSS from the HeNB 235, the eNB 230 and the MME 247 determine that the providing of voice and data communication service to the UE 180 should be handed over from the eNB 230 to the HeNB 235. This process referred to as a "handover" is illustrated in more detail in FIG. 3A.

Figure 3A:
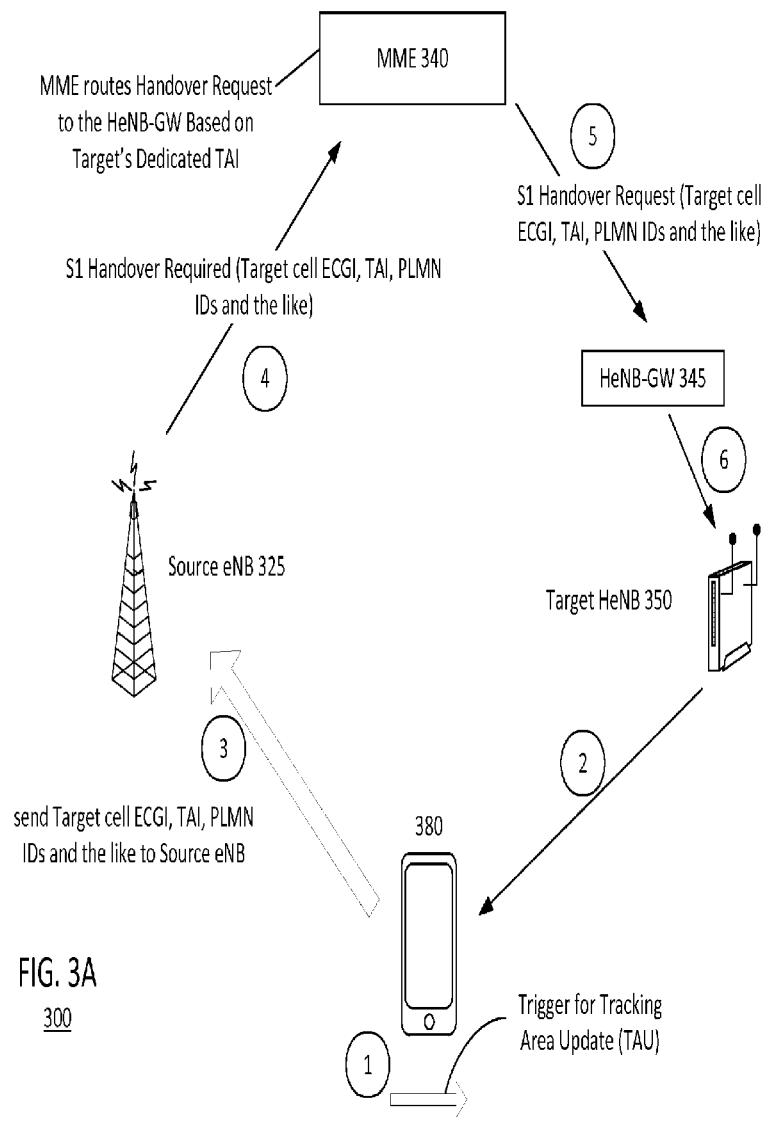
FIG. 3A is a process diagram showing an example of a mobile device handover request according to an example of the described subject matter.
Figure 3B:
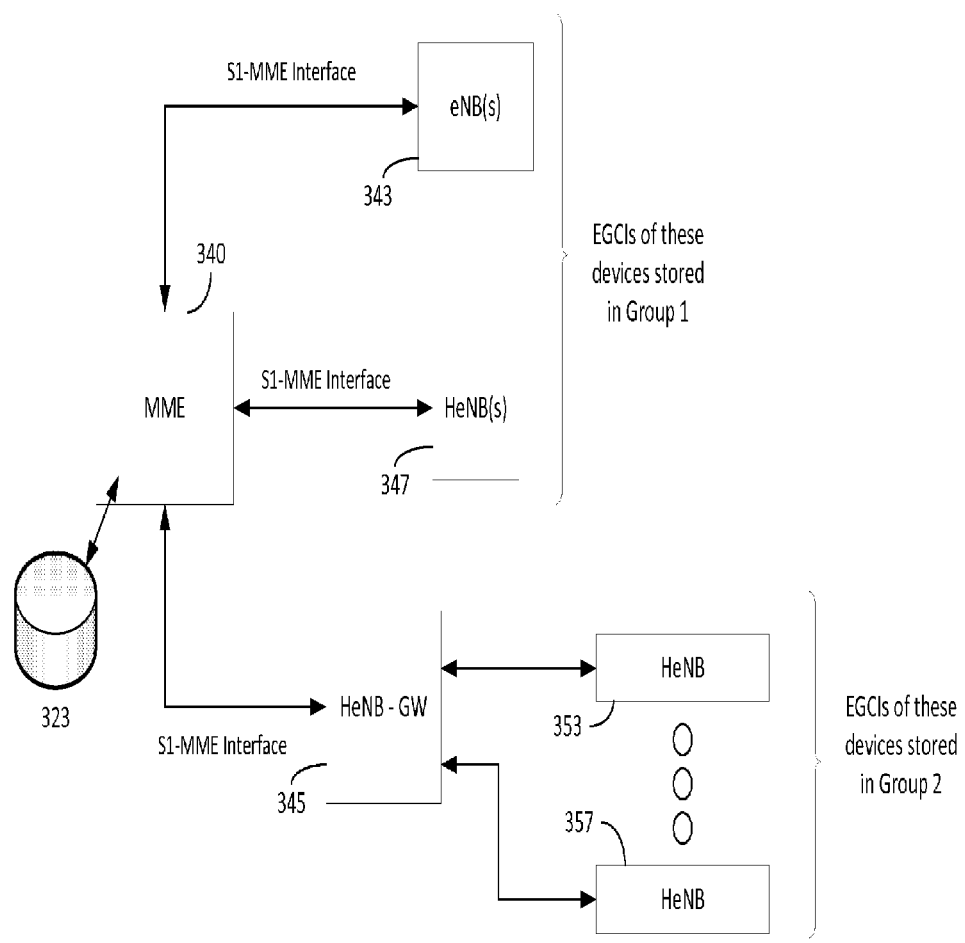
FIG. 3B is a high-level functional block diagram of an example of a network device and a supported network device configuration according to an example of the described subject matter.

FIG. 3A is a process diagram showing an example of a mobile device handover request according to an example of the described subject matter. The network environment 300 of FIG. 3B includes a source eNB 325, a target HeNB 350, a UE 380, an HeNB-GW 345, and a MME 340. The MME 340, for example, includes a communication interface configured to send and receive signaling communications via a mobile wireless communication network, a memory that stores, for example, handover routing information, and a processor coupled to the interface and the memory.

In the example of FIG. 3A, the source eNB 325 is the base station that is providing service to the UE 380. The MME 340 may also include an interface with a small-scale base station gateway, such as HeNB-GW 345. The structural details of an MME, such as MME 340, are described in more detail with reference to FIG. 5. The MME 340 processor is also configured to transmit control signals to the mobile device to perform functions related to mobility management and other network-related functions. The functions are described in more detail with reference to the steps illustrated in FIG. 3A.

As mentioned above with respect to FIG. 2, the UE 380 triggers one of the conditions for a TAU. This is shown as step 1 in FIG. 3A. As part of the TAU, the UE 380 detects reference signals from base stations in the vicinity of the UE 380. For example, the UE 380 may be provided, for example, by an eNB servicing the UE 380 or the like, with a list of base stations that are servicing neighboring cells (macro-scale cells and small-scale cells). The list includes frequency information related to the signals transmitted by each base station so the UE may tune to the appropriate frequency to detect reference signals from the respective base stations in the list. The overhead messages from the respective base stations include information that identifies the respective base station transmitting the reference signal.

As background, each base station has information that is used by different components of the mobile communication network to identify or monitor network utilization and/or performance. For example, the target eNB 350 provides signals to the UE 380 that include an enhanced cell global identifier (ECGI), and a TAI (both of which will be described in more detail below). In addition, the respective base station may include a closed subscriber group (CSG) identity (CSGI). A CSG is a group of users that have access to the particular HeNB, such as HeNB 350. The group of users that may have access the HeNB and are able to receive voice and data communication service via the femtocell are included in a list stored in the HeNB 350. For example, identifiers of the respective UEs of the users in the allowed group may be stored in the list. The CSG is determined when the HeNB 350 is configured. Alternatively, the HeNB 350 may be configured as having open access in which case any user is able to access the HeNB 350 and obtain voice and data communication service via the femtocell.

Each of these identifiers (i.e., ECGI, TAI and/or CSGI) provides different information to the source eNB 325 and the MME 340 about the target eNB 350. Some of the identifiers may be concatenations of other identifiers. For example, the PLMN ID is an identifier that identifies the network in which the target base station is connected. The PLMN ID is a combination of two other identifiers: a mobile country code (MCC) and a mobile network code (MNC). The MCC identifies the home country (e.g., USA) of the UE subscriber and the MNC identifies the network within the MCC.

For example, the HeNB 350 provides its assigned ECGI identifier to the UE 380. The ECGI is an identifier that uniquely identifies a cell, which is a geographical area, serviced by a base station in the mobile communication network. The cell may be referred to as a macrocell (i.e., a macro-scale cell), which is serviced by an eNB or a femtocell (i.e., a small-scale cell), which is serviced by a HeNB. Recall that the target HeNB 350 provides the ECGI and the TAI of the target HeNB 350 to the UE 380 in the reference signals transmitted by the HeNB 350. The target HeNB 350 ECGI is a concatenation of different types of identifiers. In this example, the target HeNB 350 ECGI uniquely identifies the HeNB 350 and includes a PLMN ID and an E-UTRAN identifier (ECI). The ECI has 20 bits of eNB ID and 8 bits of Cell identifier (ID). In some examples, the HeNB-GW 345 is identified by using an eNB ID and the MME can use the eNB ID to identify the HeNB-GW 345 in the mobile communication network. The 8-bit Cell ID in the ECI is used to identify HeNBs connected to the HeNB-GW 345. For example, multiple ECIs may be assigned to an HeNB-GW 345, the 20 bits of the eNB ID may be used to identify the HeNB-GW 345 and the 8 bits of the Cell ID are used to identify individual HeNBs connected to the HeNB-GW 345, such as HeNBs 353-357. The use of the ECGI by the MME 340 will be discussed in more detail below.

Returning to step 3 of the example of FIG. 3A, the UE 380 reports the information included in the respective reference signals of the detected base stations such as a ECGI, TAI, PLMN IDs and the CSGI of the respective bases stations detected by the UE 380 to the source eNB 325. The UE 380 may also report measurements performed by the UE 380, such as RSS, related to the received reference signals to the source eNB 325 (shown as Step 2). The source eNB 325 sends the information to MME 340. The information send to the MME 340 by the source eNB 325 includes the various identifiers, target cell ECGI, PLMN ID, CSG information, if relevant, and any similar information of other eNBs or HeNBs detected by the UE 380 to the source eNB 325. The information sent to the MME 340 also includes identifying information of the source eNB 325. The source eNB 325 may with or without the cooperation of the MME 340 determine that service to the UE 380 should be handed over to the target HeNB 350 from the source eNB 325. For example, based on the information, the source eNB 325 and the MME 340 determines that a handover from the source eNB 325 to another base station, in this case, target HeNB 350 is appropriate. The handover determination may be made based on one or more factors, such as the networks utilization of resources, the measured signal quality of the other base stations in comparison to the measured signal quality of the source eNB 325, and the like. In the example, the target HeNB 350 may be determined to be the optimum (e.g., based on signal quality and network utilization) base station for delivering voice and data communication to the UE 380. In response to the source eNB 325 making the handover determination, the source eNB 325 generates a handover request that is forwarded to the MME 340 (step 4). The handover request sent to the MME 340. The information in the handover request, for example, includes information, such as the various identifiers, target cell ECGI, PLMN ID, CSG information, specific to the target HeNB 340, which the optimum base station to provide service to the UE 380.

The MME 340 has to route the UE 380 information to the base station identified in the handover request information. In order to determine how to route the information, the MME 340 may use different techniques to determine the identity of the target HeNB. The different techniques may be better explained with reference to FIG. 3B. The mobile communication environment 301 of FIG. 3B includes the MME 340 which is connected to a number of base stations, eNB(s) 343, HeNB(s) 347 and an HeNB-GW 345. The communication between the MME 340 and the eNB(s) 343, HeNB(s) 347 and an HeNB-GW 345 is via a communication protocol referred to as the S1-MME interface. The eNBs 343 are macro-scale base stations, each of which is assigned a TAI. In some examples, multiple eNBs 343 may share the same TAI. The directly connected HeNBs 347 are also assigned TAIs similar to the macro-scale base stations, such as eNB 343. Although the HeNB(s) 347 are considered small-scale base stations similar to HeNBs 353 and 357, the HeNB(s) 347 are not assigned TAIs from the pool of dedicated TAIs because the HeNB(s) 347 are directly connected to, or, in other words, managed by, the MME 340 without reliance on a HeNB-GW. The HeNB-GW 345, as mentioned above, manages operation of several HeNBs, such as HeNB 353-357. The HeNB-GW 345, in some examples, has a single TAI assigned to it. This single TAI is assigned from the pool of TAIs dedicated for assignment to HeNBs. Note that all of the TAI assignments and other information needed or managed by the MME 340 may be stored in a database 423 accessible to the MME 340.

In the above example, when a single TAI is assigned to the HeNB-GW 345, each of the HeNBs 353-357 are grouped within that TAI. Alternatively, in other examples, the HeNB-GW 345 has more than one TAI assigned to it. Each of the more than one TAI may have one or more of the HeNBs 353-357 grouped in the respective TAI. For example, TAI-XX and TAI-YY are assigned to the HeNB-GW 345, and HeNB 353 may be assigned to TAI-XX and HeNBs 354-357 may be assigned to TAI YY. The assignment of the HeNB to a particular TAI may be based on a number of predetermined factors, such as distance of the HeNB location to a center point of the area covered by the TAI, a number of HeNBs already assigned to a TAI, balancing the number of HeNBs assigned to the pool of TAIs (i.e., attempt to evenly spread the assignment of HeNBs among the TAIs in the TAI pool), or the like. The MME 340, when operating in a network environment, such as 301 that permits a MME to be directly coupled to an HeNB, such as HeNB(s) 347, is able to use the TAI assigned to the target HeNB to locate the target HeNB for delivery of the handover information. Alternatively, if the target HeNB is managed by HeNB-GW 345, the MME 340 needs only to locate the HeNB-GW 345 because the HeNB-GW 345 is able to use the handover information to locate the target HeNB, which HeNB-GW 345 is managing.

For example, network device, such as MME 340, includes a communication interface, a memory and a processor. The hardware details of the network device, such as MME 340 are discussed in further detail with reference to FIG. 5. The communication interface is configured to send and receive signaling communications via a mobile wireless communication network. The memory storing handover routing information in a routing list, a list of target base stations connections within the mobile wireless communication network, and program instructions. The processor is coupled to the interface and the memory. The processor of the MME 340 may execute logic embodied in program instructions stored in memory.

In an example, the MME 340 receives handover requests from respective mobile devices via the mobile wireless communication network and a communication interface. Each handover request, for example, is requesting handover of the respective mobile device from a macro-scale base station of the mobile wireless communication network to a target base station identified by an enhanced cell global identifier included in handover information contained in the handover request. The executed logic in response to each respective one of at least a plurality of the handover requests, determines from the enhanced cell global identifier in each respective handover request that the target base station identified in the respective handover request is a small-scale base station. The logic further in response to each determination of an identified target base station as being a small-scale base station, compares the enhanced cell global identity of the identified target base station with a list of target cells not directly connected to the network device providing control services to the respective mobile device. In response to a result of the comparison indicating a negative match result, the processor executing the logic further compares the enhanced cell global identity of the identified target base station with a routing list of target base stations directly connected to the network device providing the control services to the respective mobile device. In this example, the handover request message is routed to the identified target base station in response to a result of the further comparison indicating a positive match.

Continuing with the example, in response to the initial comparison result indicating that the identified target base station is in the list of target base stations not directly connected to the network device, the handover request is routed to another network device for ultimate routing to a network device that provides control service to the UE. Alternatively, a message may be returned to the UE that a handover to the target base station is not permitted. In response, the UE may either request a handover to another target base station or may choose to remain under control of the network device providing control services. Similarly, in response to the further comparison providing a negative result, the handover request is routed to another network device for ultimate routing to a network device that provides control service to the UE. Alternatively, a message may be returned to the UE that a handover to the target base station is not permitted.

As discussed above, the dedicated pool of TAIs is required for assignment to HeNB-GWs so that the MME can correctly route messages based on the assigned TAI. In addition, since the TAIs in the pool are dedicated for assignment to the HeNB-GWs in the mobile communication network, the TAIs in the dedicated pool cannot be used for assignment to the macro-scale eNBs. In some implementations, a HeNB-GW, such as HeNB-GW 345, has multiple TAIs assigned to it from the dedicated pool of TAIs. Once the message is directed to the correct HeNB-GW, then the HeNB-GW routes the message to the correct HeNB based on the other identifiers included in or with the message. However, to reduce the use of the TAI and therefore, reduce the need to have a dedicated pool of TAIs, other techniques that do not rely on the TAI may be used. In another example, the MME 340 may be configured in to rely on the ECGI, which, as discussed above, is a concatenation of a PLMN ID, an eNB identifier, and a cell identifier.

To explain the use of ECGI in more detail reference is made to FIG. 4, which shows a networking environment 400 that includes an MME 440 coupled to a HeNB-GW 445. Each HeNB-GW in the network environment, such as HeNB-GW 445, is able to manage 256 HeNBs, such as HeNBs 451-455. Although the HeNB-GW 445 is not an eNB, the MME 440 assigns an eNB identifier to the HeNB-GW 445. The HeNB-GW 445 is able to generate its own ECGI group based on the eNB identifier. As such, each of the HeNBs 451-455 managed by the HeNB-GW 445 is assigned one of the 8-bit cell identifiers included in an ECGI. In other words, the HeNB-GW 445 is able to assign an 8 bit identifier (i.e., a Cell identifier (ID) in the ECGI) to the target HeNB 340 that is used by the HeNB-GW 445 to uniquely identify the target HeNB 340. The 8-bit Cell ID is concatenated to the eNB ID to create the ECGI of the respective HeNBs 451-455. In an example, all of the HeNBs 451-455 connected to the HeNB GW 445 share the same HeNB ID that is assigned to the HeNB-GW 445, but each HeNB is uniquely identifiable by the 8 bits of the Cell ID.

For example, referring back to FIG. 3B, the MME 340 has created ECGI groups that are stored in memory 323. A first ECGI group may include macro-cell eNBs 343 and directly connected HeNBs 347, and a second ECGI group may include the ECGI of HeNB-GW 345. One of the HeNBs 353-357 is the target HeNB selected for handover from the source eNB. Returning to the example of FIG. 3A, the MME 340 by applying the ECGI techniques discussed above, to the handover information (i.e., the target HeNB TAI, ECGI and CSG information) passed by the source eNB 325 (at step 4), the MME 340 is able to identify the HeNB-GW 345 as the device that is managing the target HeNB 340. At step 5 of FIG. 3A, the MME 340 delivers the handover request information to the HeNB 345 in preparation for handing over service from the source eNB 325 to the target HeNB 345.

After receiving the handover information from the MME 340, the HeNB-GW 345, which is, in this example, an intermediary device, determines the identity of the target HeNB 340 by a process explained with reference to FIG. 4. As shown in FIG. 4, the HeNB-GW 445 has an ECGI equal to 123456xx. In other words, the MME 440 uses, for example, only the first 6 digits of the ECGI to determine that the ECGI is assigned to the HeNB-GW 445 as opposed to any other eNBs or directly connected HeNBs. For example, the MME 440 may access a routing list or other database structure that lists ECGIs of the respective HeNB-GWs and compare the ECGI to ECGIs in the routing list. The routing list may be for the entire mobile communication network or specific to the devices managed by the MME 440. After determining the ECGI is specific to the HeNB-GW 445, the MME 440 passes the handover information to the HeNB-GW 445. In response to receiving the handover information, a processor in the HeNB-GW 445 analyzes the entire ECGI or only the cell id (last 8 bits) of the ECGI to determine the identity of the target HeNB in the group of HeNBs 451-455. Upon identifying the target HeNB, the HeNB-GW 445 sends the handover information to the identified target HeNB.

An advantage of the described examples is that the dependency on a dedicated list of TAIs for the HeNBs is no longer required and the operators can set the same TAI for a HeNB as the TAI assigned to the overlaying eNB. These features make the TAI planning simpler and reduce unnecessary overhead signaling and "ping-pong" scenarios of TAU procedure triggering as the UE skirts (i.e., moves in and out of—ping-pongs) the border areas between an HeNB and an eNB.

Figure 5:
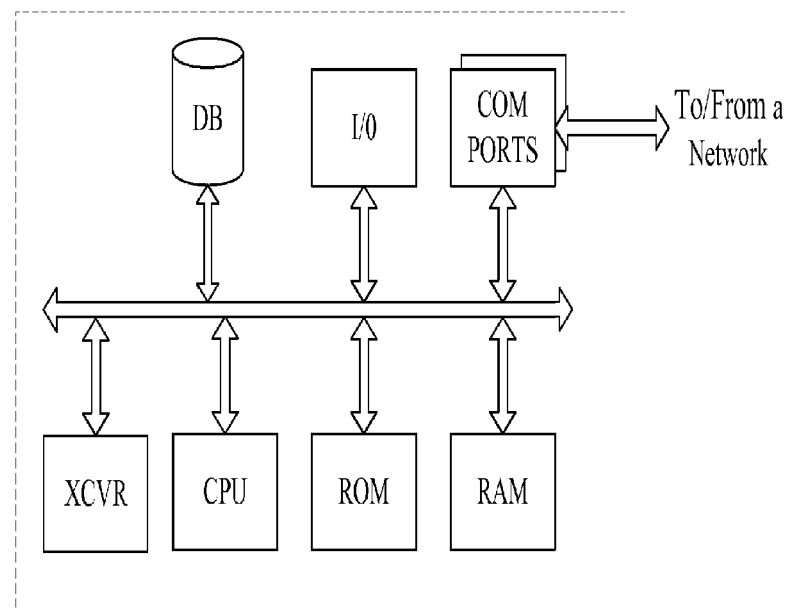
FIG. 5 is a simplified functional block diagram of a computer that may be configured as a network device, such as a mobility management entity or a HeNB gateway according to an example of the described subject matter.

FIG. 5 is a simplified functional block diagram of a computer that may be configured as a network device, such as a mobility management entity or a HeNB gateway according to an example of the described subject matter.

A server or controller, for example, includes a data communication interface for packet data communication. The server, controller or device, such as a base station (e.g. eNB) or a cellular network mobility management entity (e.g. MME), also includes a central processing unit (CPU), in the form of one or more processors, for executing program instructions. The server platform typically includes an internal communication bus, program storage and data storage for various data files to be processed and/or communicated by the server, although the server often receives programming and data via network communications. In addition, to the communication ports for exchanging communications with a network, the server or controller may be equipped with a wireless communications transceiver to communicate with devices, such as the base station (e.g. eNB) or the cellular network mobility management entity (e.g. MME). In addition, such a wireless network base station or cellular network MME includes one or more wireless transceivers in order to provide communications services to one or more mobile devices (e.g., UE) via various radio frequencies in compliance with one or more wireless communications standards (e.g., LTE). The hardware elements, operating systems and programming languages of such servers are conventional in nature. Of course, the server functions may be implemented in a distributed fashion on a number of similar platforms, to distribute the processing load.

At least some aspects of the method for effecting efficient handover of UE service and control without or with limited use of a TA as outlined above may be embodied in programming, e.g. for the mobile device, the connectable device, and/or the provisioning system server. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the provisioning system into the computer platform of a user mobile device or a connectable device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the connectable device provisioning service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer or the like can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 180, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first device, comprising:
   one or more processors to:
      receive a request for a handover of a mobile device from a first base station to a second base station,
         the first base station being a macro-scale base station, and
         the request including handover information,
            the handover information including an identifier,
               the identifier being a type of identifier used to identify at least macro-scale base stations and small-scale base station gateways,
                  a macro-scale base station, of the macro-scale base stations, providing cellular communication service to a macrocell coverage area;
      determine that the second base station is a small-scale base station based on the identifier identifying a particular small-scale base station gateway,
         the small-scale base station providing a small-scale cell coverage area;
      determine, based on the identifier and based on determining that the second base station is the small-scale base station, that the second base station is connected to the particular small-scale base station gateway,
         one or more small-scale base stations, including the second base station, being managed by the particular small-scale base station gateway, and
         the particular small-scale base station gateway and the first base station being managed by the device; and
      provide the handover information to the particular small-scale base station gateway based on determining that the second base station is connected to the particular small-scale base station gateway.

2. The first device of claim 1, where the one or more processors are further to:
   determine that the handover from the first base station to the second base station is appropriate based on one or more factors,
      the one or more factors including at least one of:
         a utilization of network resources, or
         a measured signal quality of other base stations in comparison to a measured signal quality of the first base station; and
   where the one or more processors, when receiving the request, are to:
      receive the request based on determining that the handover is appropriate.

3. The device of claim 1, where the identifier is a concatenation of:
   a public land mobile network identifier,
   a base station identifier, and
   a cell identifier.

4. The device of claim 1, where the one or more processors are further to:
   utilize a tracking area identifier to locate the second base station; and
   where the one or more processors, when providing the handover information, are to:
      provide the handover information after locating the second base station.

5. The first device of claim 1,
   where the one or more processors are further to:
      locate the particular small-scale base station gateway; and
   where the one or more processors, when providing the handover information, are to:
      provide the handover information to permit the particular small-scale base station gateway to utilize the handover information to locate the second base station.

6. The device of claim 1, where the one or more processors, when providing the handover information, are to:
   provide the handover information to permit the particular small-scale base station gateway to identify the second base station after providing the handover information.

7. The first device of claim 1, where the one or more processors are further to:
   utilize a portion of the identifier to determine that the identifier is assigned to the particular small-scale base station gateway; and
   where the one or more processors, when providing the handover information, are to:
      provide the handover information to the particular small-scale base station gateway to:
         permit the particular small-scale base station gateway to analyze the identifier to identify the second base station, and
         permit the particular small-scale base station gateway to provide the handover information to the second base station based on the particular small-scale base station gateway identifying the second base station.

8. A non-transitory computer-readable medium storing instructions, the instructions comprising:
one or more instructions that, when executed by one or more processors of a first device, cause the one or more processors to:
receive a request for a handover of a mobile device from a first base station to a second base station,
the first base station being a first type of base station, and
the request including handover information,
the handover information including an identifier,
the identifier being a type of identifier used to identify base stations of the first type of base station and gateways of a second type of base station;
determine that the second base station is the second type of base station based on the identifier identifying a particular gateway of the second type of base station;
determine, based on the identifier and based on determining that the second base station is the second type of base station, that the second base station is connected to the particular gateway,
one or more small-scale base stations, including the second base station, being managed by the particular gateway and
the particular gateway and the first base station being managed by the device; and
provide the handover information to the particular gateway based on determining that the second base station is connected to the particular gateway.

9. The non-transitory computer-readable medium of claim 8, where the one or more instructions, when executed by the one or more processors, further cause the one or more processors to:
determine whether the second base station is in a list of target base stations not directly connected to the particular gateway based on determining that the second base station is the second type of base station.

10. The non-transitory computer-readable medium of claim 9, where the list of target base stations is a first list of base stations, and where the second base station is not in the first list of base stations; and
where the one or more instructions, when executed by the one or more processors, further cause the one or more processors to:
determine that the second base station is in a second list of base stations directly connected to the particular gateway; and
route the request to the second base station based on determining that the second base station is in the second list of base stations.

11. The non-transitory computer-readable medium of claim 9, where the second base station is in the list of target base stations, and
where the one or more instructions, when executed by the one or more processors, further cause the one or more processors to:
route the request to a network device for ultimate routing to a particular network device that provides control service to the mobile device.

12. The non-transitory computer-readable medium of claim 8, where the one or more instructions, when executed by the one or more processors, further cause the one or more processors to:
determine that the handover from the first base station to the second base station is appropriate based on one or more factors,
the one or more factors including at least one of:
a utilization of network resources, or
a measured signal quality of other base stations in comparison to a measured signal quality of the first base station; and
where the one or more processors, when receiving the request, are to:
receive the request based on determining that the handover is appropriate.

13. The non-transitory computer-readable medium of claim 8, where the identifier is a concatenation of:
a public land mobile network identifier,
a base station identifier, and
a cell identifier.

14. The non-transitory computer-readable medium of claim 8, where the one or more instructions, when executed by the one or more processors, further cause the one or more processors to:
utilize a tracking area identifier to locate the second base station; and
where the one or more processors, when providing the handover information, are to:
provide the handover information after locating the second base station.

15. A method, comprising:
receiving, by a device, a request for a handover of a mobile device from a first base station to a second base station,
the request including handover information,
the handover information including an identifier,
the identifier being a type of identifier used to identify at least macro-scale base stations and small-scale base station gateways;
determining, by the first device, that the second base station is a small-scale base station based on the identifier identifying a particular small-scale base station gateway;
determining, by the device, based on the identifier, and based on determining that the second base station is the small-scale base station, that the second base station is connected to the particular small-scale base station gateway,
one or more small-scale base stations, including the second base station, being managed by the particular small-scale base station gateway, and
the particular small-scale base station gateway and the first base station being managed by the device; and
providing, by the first device, the handover information to the particular small-scale base station gateway based on determining that the second base station is connected to the particular small-scale base station gateway.

16. The method of claim 15,
where the method further comprises:
locating the particular small-scale base station gateway; and
where providing the handover information comprises:
providing the handover information to permit the particular small-scale base station gateway to utilize the handover information to locate the second base station.

17. The method of claim 15, where providing the handover information comprises:
providing the handover information to permit the particular small-scale base station gateway to determine the second base station after providing the handover information.

18. The method of claim 15, further comprising:
utilizing a portion of the identifier to determine that the identifier is assigned to the particular small-scale base station gateway; and
where providing the handover information comprises:
providing the handover information to the particular small-scale base station gateway to:
permit the particular small-scale base station gateway to analyze the identifier to identify the second base station, and
permit the particular small-scale base station gateway to provide the handover information to the second base station based on the particular small-scale base station gateway determining the second base station.

19. The method of claim 15, further comprising:
determining whether the second base station is in a list of target base stations not directly connected to the particular small-scale base station gateway based on determining that the second base station is small scale base station.

20. The method of claim 19, where the list of target base stations is a first list of base stations, and where the second base station is not in the first list of base stations; and
where the method further comprises:
determining that the second base station is in a second list of base stations directly connected to the particular small-scale base station gateway; and
routing the request to the second base station based on determining that the second base station is in the second list of base stations.

* * * * *